US012596796B2

(12) United States Patent

Hershman

(10) Patent No.: US 12,596,796 B2

(45) Date of Patent: Apr. 7, 2026

(54) SELF-SYNCHRONOUS SIDE-CHANNEL ATTACK COUNTERMEASURE

(71) Applicant: Nuvoton Technology Corporation, Hsin-chu (TW)

(72) Inventor: Ziv Hershman, Givat Shmuel (IL)

(73) Assignee: Nuvoton Technology Corp., Hsinchu (TW)

( * ) Notice: Subject to any disclaimer, the term of this patent is extended or adjusted under 35 U.S.C. 154(b) by 226 days.

(21) Appl. No.: 18/340,902

(22) Filed: Jun. 26, 2023

(65) Prior Publication Data

US 2024/0427882 A1 Dec. 26, 2024

(51) Int. Cl.
*G06F 21/55* (2013.01)
*G06F 21/71* (2013.01)

(52) U.S. Cl.
CPC ............ *G06F 21/554* (2013.01); *G06F 21/71* (2013.01); *G06F 2221/034* (2013.01)

(58) Field of Classification Search
CPC ... G06F 21/554; G06F 21/71; G06F 2221/034
See application file for complete search history.

(56) References Cited

U.S. PATENT DOCUMENTS 6,166,990 A * 12/2000 Ooishi ................ G11C 11/4076
365/194
8,947,123 B2 2/2015 Verbauwhede et al.

| | | | | |
|---|---|---|---|---|
| 10,572,619 | B2 | 2/2020 | Levi et al. | |
| 12,206,760 | B1 * | 1/2025 | Mohajerani | ............. H04L 9/003 |
| 2003/0030472 | A1 * | 2/2003 | Takata | ....................... H03L 7/00 |
| | | | | 327/141 |
| 2011/0302426 | A1 * | 12/2011 | Boehl | ..................... H04L 9/003 |
| | | | | 713/189 |
| 2013/0219187 | A1 * | 8/2013 | Furtner | ................. G06F 21/755 |
| | | | | 711/E12.001 |
| 2021/0097175 | A1 | 4/2021 | Hoerder | |

OTHER PUBLICATIONS

Nagpal et al., "Riding the Waves Towards Generic Single-Cycle Masking in Hardware," IACR Transactions on Cryptographic Hardware and Embedded Systems, vol. 2022, No. 4, pp. 1-26, Aug. 2022.

(Continued)

*Primary Examiner* — Linglan Edwards
*Assistant Examiner* — Kamryn J Gillespie
(74) *Attorney, Agent, or Firm* — Meitar Patents Ltd.; Daniel Kligler

(57) ABSTRACT

An Attack Resilient Computation Circuit (ARCC) in an integrated circuit (IC) includes a first computation stage, a second computation stage, and security circuitry. The first computation stage is configured to process one or more signals so as to produce one or more outputs, the first computation stage having multiple signal propagation paths. The second computation stage is configured to receive and process the outputs of the first computation stage. The security circuitry is configured to generate a synchronization signal indicating that propagation of the signals in the first computation stage has completed, and to inhibit the second processing stage from processing the outputs of the first processing stage for a time interval derived from the synchronization signal.

16 Claims, 4 Drawing Sheets

(56) References Cited

OTHER PUBLICATIONS

Gross et al., "Domain-Oriented Masking: Compact Masked Hardware Implementations with Arbitrary Protection Order", Institute for Applied Information Processing and Communications (IAIK), Graz University of Technology, Graz, Austria, pp. 1-24, year 2016.

Nikova et al., "Threshold Implementations Against Side-Channel Attacks and Glitches," Proceedings of the 8th International Conference on Information and Communications Security, pp. 1-17, year 2006.

IowRisc / OpenTitan, "AES HWIP Technical Specification," pp. 1-21, year 2022, as downloaded from https://github.com/lowRISC/opentitan/blob/09dc7984402fd16005ffa3e15382c25c4c12f6f2/hw/ip/aes/doc/_index.md.

IowRisc / OpenTitan, "OpenTitan is the Frst Open Source Project Building a Transparent, High-quality Reference Design and Integration Guidelines for Silicon Root of Trust (RoT) Chips", pp. 1-8, years 2019-2023, as downloaded from https://opentitan.org/.

Zeng et al., "Improvement on Masked S-box Hardware Implementation," Conference Paper, 2012 International Conference on Innovations in Information Technology (IIT), IEEE, pp. 1-5, year 2012.

Gosh et al., "Preventing the Side-Channel Leakage of Masked AES S-Box," Conference Paper, 15th International Conference on Advanced Computing and Communications (ADCOM), IEEE, pp. 15-20, year 2007.

Kumar et al., "Design of a Differential Power Analysis Resistant Masked AES S-Box," Indocrypt 2007, Springer-Verlag Berlin Heidelberg, pp. 373-383, year 2007.

Leiserson et al., "Gate-Level Masking Under a Path-Based Leakage Metric," Conference Paper, International Workshop on Cryptographic Hardware and Embedded Systems, Lecture Notes in Computer Science, vol. 8731, pages 1-18, year 2014.

* cited by examiner

{I_1[1:n], IS_1} —n+1→

{I_2[1:n], IS_2} —n+1→

{I_k[1:n], IS_k} —n+1→ random —j→

*202* propagation delay circuit

...

N SHARES, K-INPUT SCC

*200*

—n+1→ {O[1:n], OS}

*300*

*306* — Os

DLY

*304* n — D   Q — n — Out

FF

CK

*302*

CLOCK

*350*

*354* — TFF — Q

CK

DLY

*358*

*356* — Os n — Q — n — Out

FF

CK

*352*

CLOCK

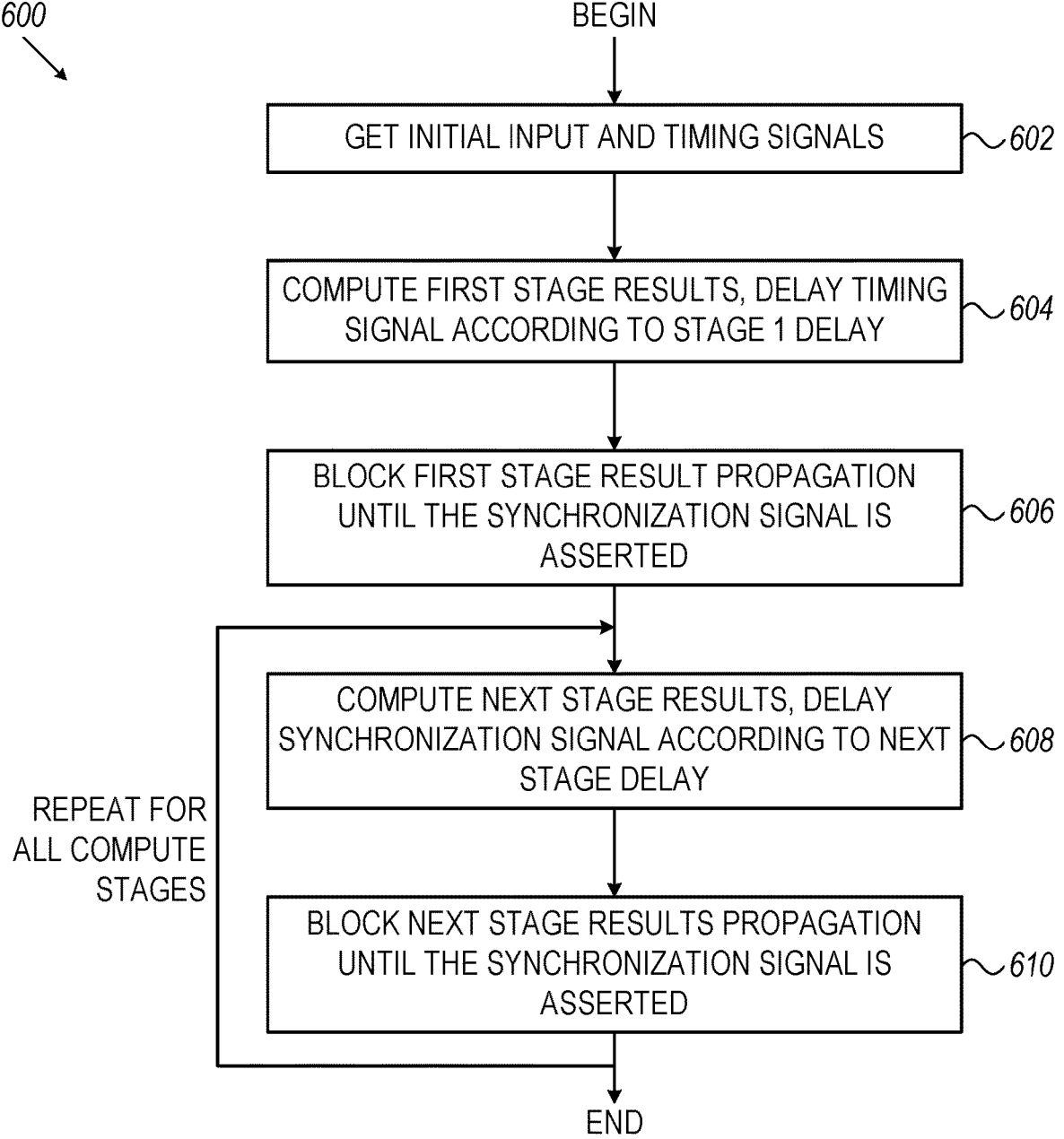

*600*

BEGIN

GET INITIAL INPUT AND TIMING SIGNALS  ~*602*

COMPUTE FIRST STAGE RESULTS, DELAY TIMING SIGNAL ACCORDING TO STAGE 1 DELAY  ~*604*

BLOCK FIRST STAGE RESULT PROPAGATION UNTIL THE SYNCHRONIZATION SIGNAL IS ASSERTED  ~*606*

COMPUTE NEXT STAGE RESULTS, DELAY SYNCHRONIZATION SIGNAL ACCORDING TO NEXT STAGE DELAY  ~*608*

REPEAT FOR ALL COMPUTE STAGES

BLOCK NEXT STAGE RESULTS PROPAGATION UNTIL THE SYNCHRONIZATION SIGNAL IS ASSERTED  ~*610*

END

*FIG. 6*

SELF-SYNCHRONOUS SIDE-CHANNEL ATTACK COUNTERMEASURE

FIELD OF THE INVENTION

The present invention relates generally to security of integrated circuits (ICs), and, particularly, to side-channel attack resiliency of ICs.

BACKGROUND OF THE INVENTION

Domain-Oriented Masking (DOM) and threshold implementation (TI) are known methods for crafting provably secured side-channel attack resistant cryptographic circuits under a given set of assumptions.

In "Domain-Oriented Masking: Compact Masked Hardware Implementations with Arbitrary Protection Order", H. Gross et. al., Institute for Applied Information Processing and Communications (IAIK), Graz University of Technology, Inffeldgasse Graz, Austria (2016), the authors assert that passive physical attacks, like power analysis, pose a serious threat to the security of embedded systems, and that corresponding countermeasures need to be implemented. The authors proceed to demonstrate how the costs for protecting digital circuits against passive physical attacks can be lowered significantly, with the introduction of a masking approach called domain-oriented masking (DOM), providing the same level of security as threshold implementations (TI), but requiring less chip area and less randomness.

U.S. Patent Application Publication 2021/0097175 describes a masked logic gate protected against side-channel attacks using Boolean masking with d+1 shares for each input variable, where d is an integer representing the protection order. The masked logic gate includes a first input configured to receive a first number of shares $Y_j$; a second input configured to receive a second number of shares $X_i$ that is representative of an intermediate result output by one layer of a tree of gates implementing low-latency masking; and a third number of shares output obtained by applying a logic function of the masked logic gate to the shares of the first and second inputs using domain-oriented masking.

Another approach to combat side-channel attacks is presented in U.S. Pat. No. 10,572,619, which describes a logic element that includes a logic block, a clock generator, a clock assigner and at least one sampling element. The logic block implements a logic function on input data to obtain a plurality of output data signals. The output data signals are sampled by respective clock signals. The clock generator generates phase-shifted clock signals from a reference clock signal. The clock assigner assigns differing ones of the phase-shifted clock signals to respective output data signals. The sampling element(s) sample the output data signals in accordance with the respective assigned phase-shifted clock signals.

A Wave Dynamic Differential Logic (WDDL) approach to protect against side-channel attacks is presented in U.S. Pat. No. 8,947,123, wherein a differential logic stage is precharged or pre-discharged by a previous logic stage, such as, for example, a previous SDDL stage, a WDDL stage, etc. In one embodiment, a Divided Wave Dynamic Differential Logic (DWDDL) is provided, wherein a WDDL circuit is conveniently implemented as dual logic trees.

SUMMARY OF THE INVENTION

An embodiment of the present invention that is described herein provides an Attack Resilient Computation Circuit (ARCC) in an integrated circuit (IC). The ARCC includes a first computation stage, a second computation stage, and security circuitry. The first computation stage is configured to process one or more signals so as to produce one or more outputs, the first computation stage having multiple signal propagation paths. The second computation stage is configured to receive and process the outputs of the first computation stage. The security circuitry is configured to generate a synchronization signal indicating that propagation of the signals in the first computation stage has completed, and to inhibit the second processing stage from processing the outputs of the first processing stage for a time interval derived from the synchronization signal.

Typically, the time interval is shorter than one clock cycle of the signals. In some embodiments, the security circuitry is configured to mask the outputs of the first computation stage from reaching the second computation stage during the time interval.

In some embodiments the security circuitry includes (i) a security gating timing circuit (SGTC) configured to output the synchronization signal at a time at which propagation of the signals in the first computation stage has completed, and (ii) a security gating circuit (SGC) configured to gate the outputs of the first computation stage responsively to the synchronization signal. In various embodiments, the SGC may include a logic gate, a tri-state buffer or a latch. In an embodiment, the SGTC is configured to set the time of outputting the synchronization signal based on the maximal propagation delay of the first computation stage.

In other embodiments, the ARCC further includes a Secure Flip-Flop (SFF) that is coupled between the first computing stage and the second computing stage, the SFF configured to (i) sample an output of the first computing stage responsively to an Output Synchronization (Os) signal, and (ii) send an Input Synchronization (Is) signal to the second computing stage.

There is additionally provided, in accordance with an embodiment described herein, a method for protecting an integrated circuit (IC). The method includes processing one or more signals in a first computation stage having multiple signal propagation paths, so as to produce one or more outputs, and receiving and processing the outputs of the first computation stage in a second computation stage. Using security circuitry, a synchronization signal is generated, the synchronization signal indicating that propagation of the signals in the first computation stage has completed. The second processing stage is inhibited from processing the outputs of the first processing stage for a time interval derived from the synchronization signal.

The present invention will be more fully understood from the following detailed description of the embodiments thereof, taken together with the drawings in which:

BRIEF DESCRIPTION OF THE DRAWINGS

FIG. 6 is a flowchart that schematically illustrates a method for protection against power supply side channel attack, in accordance with an embodiment of the present invention.

DETAILED DESCRIPTION OF EMBODIMENTS

Overview

Figure 1:
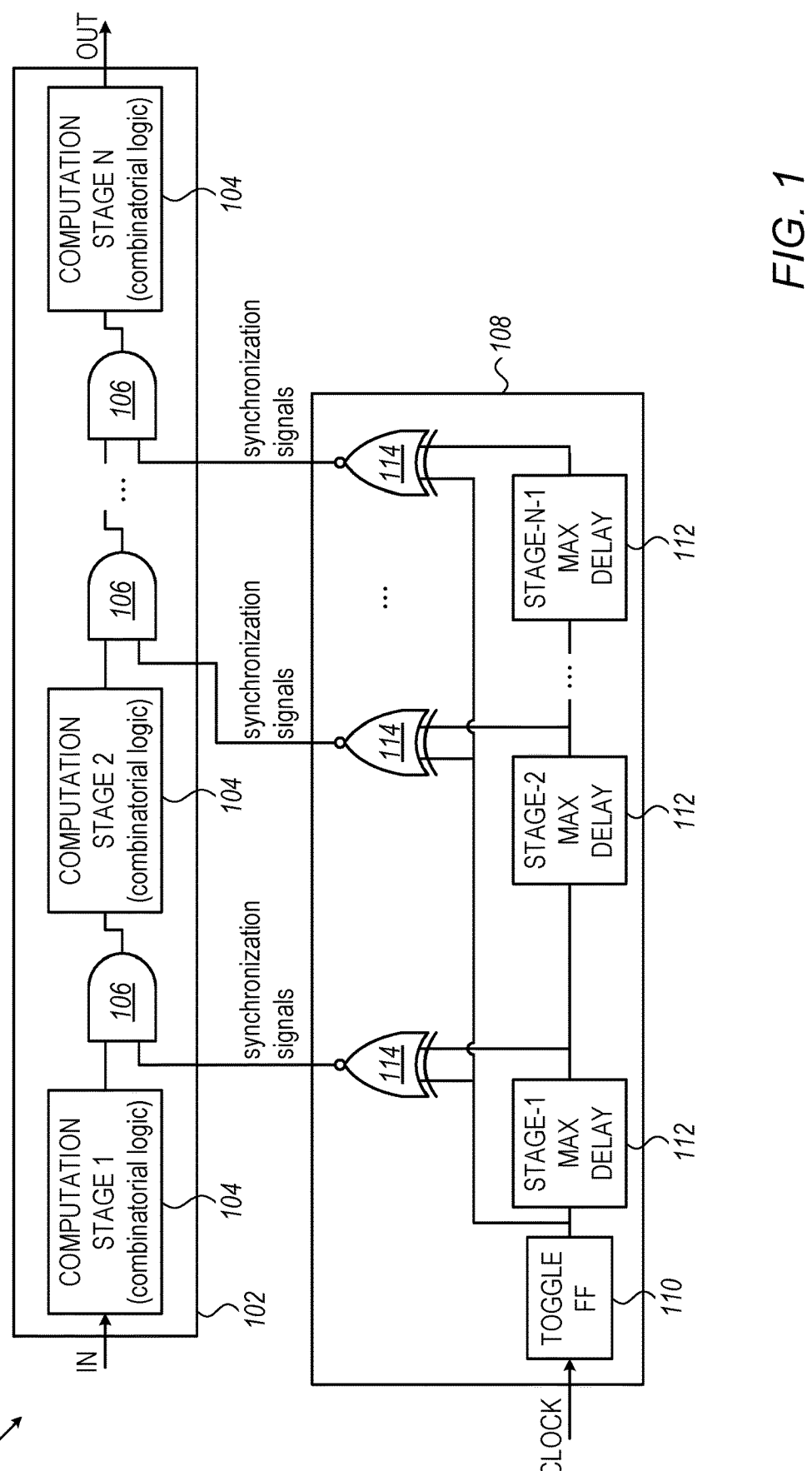
FIG. 1 is a block diagram that schematically illustrates an Attack-Resilient Computing Circuit (ARCC), in accordance with an embodiment of the present invention.

A side-channel attack targets any extra side information that can be gathered from an electronic device, such as an IC, a computer or a smart card, pertaining to the fundamental way that an algorithm works. One example is a power supply side channel attack that targets the power consumption patterns. By analyzing the variations in the device's power consumption, an attacker can infer information about the operations being performed by the device and extract cryptographic keys or other sensitive data. Another example is electromagnetic radiation attack.

Power-supply side-channel attacks can be carried out using a variety of techniques, including differential power analysis (DPA), simple power analysis (SPA), and glitch attacks. Electromagnetic side channel attacks can be carried out using, for example, Differential Electromagnetic Analysis (DEMA). Electronic circuits that include protection against security attacks, including power-supply and electromagnetic side-channel attacks, are referred to hereinbelow as Attack Resilient Computation Circuits (ARCCs).

One way to protect against DPA is masking, which makes the electrical activity in a device independent of secret values being operated upon. The secret is divided into multiple shares. Each share is random when considered individually, and the secret can be extracted only by combining the shares. Thus, operations may be performed on the shares without leaking information about the secret. However, when the shares are combined, power supply glitches may occur that enable power-supply side channel attacks.

Embodiments of the present invention that are disclosed herein provide for methods and systems that avoid power glitches from combined-shares operations by gating the output of computing stages until the computation is complete. In some embodiments, the gating does not include sampling by a clock edge; rather, the gating is delayed according to the propagation delay of the corresponding computation stage, reducing the computation speed penalty. In embodiments, the gating circuits are Boolean gates such as AND or OR (but not exclusive-OR or exclusive-NOR), in other embodiments latches or flip-flops that are clocked by a local signal (rather than the global clock) may be used, and in yet other embodiments the gating circuits comprise tri-state buffers.

In embodiments, a security gating timing circuit (SGTC) is configured to generate the gating signals (referred to as Synchronization Signals) for the computation stages, inhibiting computation stages from receiving outputs of preceding computation stages during a time interval that is derived from propagation delay in preceding stages, thus disabling signal propagation until the propagation delay of the outputs in the preceding stages is completed. In an example embodiment, the SGTC comprises a Toggle-Flip-Flop (TFF) that toggles responsively to clock edges, and a group of serially connected delay circuits, each delay circuit adding a delay responsively to the expected propagation delay of a respective computing stage. The TFF output is input to the first delay circuit, and the output of each delay circuit is input to the next delay circuit; exclusive-NOR gates then compare the TFF output to the output of each of the delay circuits and generate the gating signals responsively to a match.

In other embodiments, delay circuits that propagate the synchronization signals are embedded within the computing stages, blocking propagation between stages until the propagation is complete. In some embodiments, Secure-Flip-Flops are configured to securely sample the outputs of the computing stages, and to generate initial timing signal (also referred to as Synchronization Signal below) for the next computing stage.

In embodiments, the time interval by which the signal propagation is delayed is less than one system clock.

Thus, in embodiments, glitch-preventing gates, timed by gating signals that are matched to the delays of the computing stages, provide an effective power-supply side-channel attack countermeasures with reduced performance penalty.

System Description

Attack-Resilient Computation Circuits (ARCCs) sometimes include counter measures against power-supply side-channel attacks, including gating of computing stages to obscure the power signature of the computation and to prevent extraction of confidential data by external observation of power glitches. Embodiments that are disclosed herein reduce the frequency penalty associated with such gating.

In embodiments, a Security Gating Timing Circuit (SGTC) is configured to generate a synchronization signal, to inhibit computation stages from receiving and processing inputs from preceding computation stages during a time interval that is derived from the maximum propagation delay of signals in the preceding stages, thus, avoiding power supply glitches. In some embodiments the SGTC is centralized, and in other embodiments the SGTC is distributed; e.g., in the computing stages.

FIG. 1 is a block diagram that schematically illustrates an Attack-Resilient Computing Circuit (ARCC) 100, in accordance with an embodiment of the present invention.

ARCC 100 includes a computing circuit 102, which comprises a plurality of Computation stages 104 (designated Computation Stage 1 through Computation Stage N). Each Computation Stage comprises combinatorial logic, and computes a segment of the computation and sends the partial results to the next Computation Stage for further computation. In some embodiments, a computation stage comprises an internal multi-share linear part, and a single-share non-linear output part that sends the outputs to the next computation stage. As explained, for example, in "Domain-Oriented Masking: Compact Masked Hardware Implementations with Arbitrary Protection Order" (cited above), in case of linear functions, the independence of the domains is trivial to achieve because linear functions only require combining shares within one share domain. This means that no gating is required for the linear functions. However, if a non-linear function precedes a linear function on the same combinatorial path, the synchronization signals which accommodate for the maximum delay of the linear function needs to be provided to gate the non-linear function.

To counter power-supply side channel attacks, computation stages 104 are separated by Gates 106, which are configured to disable the propagation of data between the Computation Stages until the data is ready; for example, the output of Computation Stage 1 will not reach Computation Stage 2 until Computation Stage 1 has completed stage-1 computation. In some embodiments, Gates 106 could be any of AND, NAND, OR and NOR gates, but not an exclusive OR (XOR) or an exclusive-NOR (XNOR) (suitable logic inversions may be needed in the inputs and/or the outputs, according to the gate type). In embodiments, when suitable logic modifications are applied, any of gates 106 may comprise a tri-state buffer, a flip-flop or a latch. Gates 106 are also referred to as Security Gating Circuits (SGCs) hereinbelow.

According to the example embodiment illustrated in FIG. 1, Gates 106 are configured to allow the propagation of Computation Stage outputs at a timing that is set according to the maximum delay in each computation stage; thus, the gating timing penalty is small.

ARCC 100 comprises a centralized timing circuit 108, also referred to hereinbelow as Security Gating Timing Circuit (SGTC), which is configured to generate synchronization signals that time the gating of gates 106, thus, inhibiting computation stages from receiving data until the propagation of the data in preceding computation stages is complete. The SGTC comprises a Toggle-Flip-Flop (TFF) 110, which is configured to toggle responsively to clock edges (e.g., change state responsively to rising edges of the clock), delay circuits 112, designated Stage-1 Max-Delay through Stage-N–1 Max-Delay, and XNOR gates 114 that output the synchronization signals. The clock input to the TFF also starts the computation chain in Computation Stages 104.

The delay circuits are connected serially, from TFF 110 to the first Delay Circuit and on until the last Delay Circuit, and when TFF 110 toggles, the state-change will propagate through the series of Delay Stages. The input pairs of each XNOR gate 114 will differ from each other when the TFF toggles, but, after the state change reaches the corresponding Delay Circuit, the pair of inputs will have identical values. Consequently, each Exclusive-NOR gate 114 will generate a synchronization signal to enable data propagation through the respective Gate 106 when the computation output is ready (The combination of SGCs 106 and SGTC 108 are collectively referred to as a Security Circuit).

Thus, by cascading delay units with delays that match or exceed the expected maximum delay of corresponding computation stages, combined with non-linear logic countermeasures, power-supply side-channel attacks can be repelled.

The configuration of ARCC 100 illustrated in FIG. 1 and described hereinabove is an example that is cited for the sake of conceptual clarity. Other configurations may be used in alternative embodiments. For example, in some embodiments, TFF 110 is replaced by a Set-Reset flip-flop (SRFF) that is set at the beginning of the compute cycle and reset when its output has propagated through the last Stage-Delay; Exclusive-NOR gates 114 are then replaced by AND gates. In other embodiments the inputs of all Stage Delays 112 are connected to TFF 110, and each delay stage is configured to delay the TFF output by an accumulated delay that is equal to the maximum delay in computation circuit 102 up to the respective Gate 106.

Combinatorial and Sampling ARCC Circuits

For simplicity, we will refer hereinbelow to synchronous ARCCs that comprise a single clock source; the techniques disclosed herein, however, are not limited to single clock ARCCs; multi-clock variations and sub-variations may be included in alternative embodiments.

According to synchronous design methodology, the ARCC may comprise combinatorial circuits that are separated by sampling circuits. Note that ARCC 100 illustrated in FIG. 1 and described above is an example ARCC that includes a single clock stage; in embodiments, an ARCC may comprise one or more ARCCs 100, and/or other secure elements).

The combinatorial circuits are referred to as Secure Combinatorial Circuits (SCC) and comprise side-channel attack countermeasures. The sampling circuits (referred to as Secure Flip-Flop (SFF) below) also comprise side-channel attack countermeasures. ARCC 100, which was described hereinabove with reference to FIG. 1, is a combination of an SCC and an SFF, the SFF comprising Toggle-FF 110 and a data flip-flop (not shown) which provided clock buffering from a previous stage. Other SCC as well as SFF embodiments are described below, with reference to FIGS. 2 through 5. It should be noted that the Secure Flip-Flop is secure only in the sense that a circuit comprising the SFF coupled with other circuitry as described herein, provides some protection against side channel attacks.

In embodiments, the security circuit is distributed; SCCs comprise signal propagation combinatorial circuits and a propagating delay circuit that generates a synchronization signal. The propagation delay circuit is configured to emulate the delays of signals in the combinatorial circuit. Some, or all, of the signals in the combinatorial circuit are gated by the elements of the delay propagation circuit, to avoid power glitches (and, thus, to protect against power-supply side-channel attacks). In an embodiment, the propagation delay circuit comprises delays that are matched to the delays of the corresponding combinatorial circuit signals, to lower (or to cancel) the reduction in SCC speed.

Figure 2:
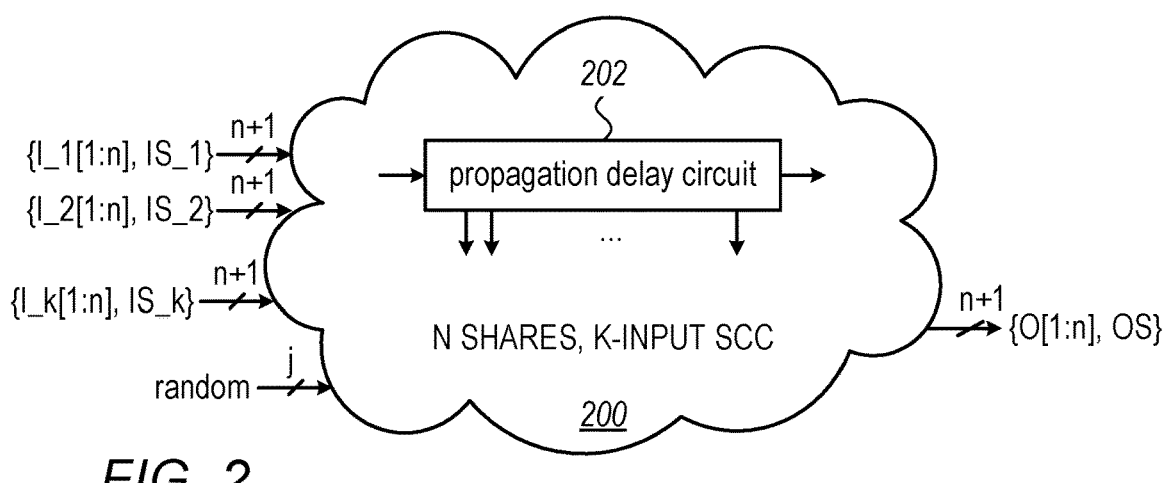
FIG. 2 is a block diagram that schematically illustrates a Secure Combinatorial Circuit (SCC), in accordance with an embodiment of the present invention.

FIG. 2 is a block diagram that schematically illustrates a Secure Combinatorial Circuit (SCC) 200, in accordance with an embodiment of the present invention. The SCC comprises k n-bit functional inputs (designated I_1 through I_k) and, for each functional input, a delay indication input, designated IS, and indicating that all corresponding inputs are stable (the delay indication input is also referred to as a synchronization signal). In embodiments, SCC 200 also comprises a j-bit random number input, to provide further protection by obscuring the computation result of the SCC.

SCC 200 further comprises a Propagation Delay circuit 202, which is configured to match signal propagation delays in the combinatorial circuit and generate an output synchronization signal, which may be used to gate signal propagation in the SCC. The synchronization Is inputs, which are coupled to the inputs of the propagation delay circuit, are asserted when the corresponding inputs of the SCC are stable. Intermediate outputs of the propagation delay circuit (designated by vertical arrows) are asserted when corresponding signals in the combinatorial circuit are stable. The (chronically) last outputs of the propagation delay circuit (designated by an horizontal arrow) indicate when output O is stable, and may be used to cascade SCC circuits (as will be described below, the SCC outputs may be input to other SCCs, or to a sampling circuit).

The configuration of SCC 200 illustrated in FIG. 2 and described hereinabove is cited by way of example. Other configurations may be used in alternative embodiments. For example, in some embodiments, there is no random input.

Sampling Circuitry

In some embodiments, the SCCs are configured to receive input signals (I) and corresponding input synchronization signals (Is), and to send output signals (O) and corresponding output synchronization signals (Os). The SFFs synchronize the outputs of the SCC to a clock; the O and the Os output signals may be input to further SCC circuits.

Figure 3A:
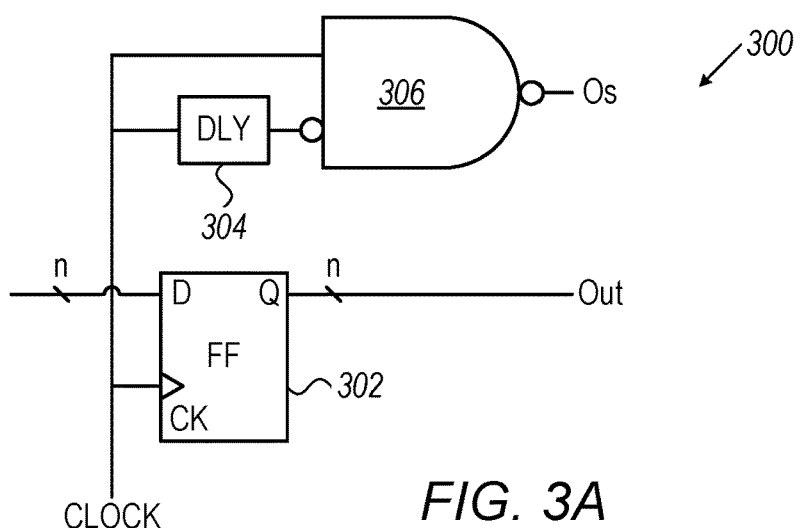
FIG. 3A is a block diagram that schematically illustrates a Secure Flip-Flop (SFF), in accordance with an embodiment of the present invention.

FIG. 3A is a block diagram that schematically illustrates a Secure Flip-Flop (SFF) 300, in accordance with an embodiment of the present invention. SFF 300 comprises a D-Flip-Flop (DFF) 302, which is configured to latch an n-bit input (e.g., an output of a preceding SCC), and forward the latched input (e.g., to the input of a proceeding SCC).

To generate the input synchronization (Is) input to the SCC, with a delay that corresponds to the output delay, SCC 300 further comprises a delay circuit 304 that delays the clock input, and a NAND gate 306 that NANDs the clock input and the inversion of the output of the delay circuit, to generate the Os signal.

The delay of delay circuit 304 is set responsively to the difference between the delay of SFF 302 and NAND gate 306. From the time that the clock input transitions from logic low to logic high, and until the delay circuit transitions to logic high, NAND gate 306 will output logic low; after a delay, the delay circuit will output the transition to the AND gate, which will, responsively, output a logic-high. Thus, the output Os will be delayed relative to the clock by a period set according to the delay of DFF 302.

Figure 3B:
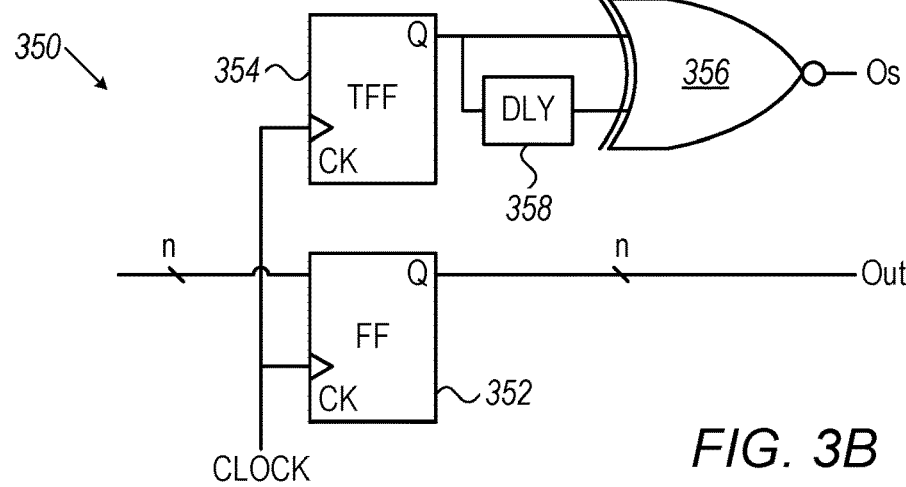
FIG. 3B is a block diagram that schematically illustrates an alternative SFF, in accordance with an embodiment of the present invention.

FIG. 3B is a block diagram that schematically illustrates an alternative SFF 350, in accordance with an embodiment of the present invention. DFFs 352 latch and forward an n-bit input (e.g., to a proceeding SCC). A Toggle-Flip-Flop (TFF) 354 toggles upon rising clock edges. To generate the Os output, SFF 350 further comprises an Exclusive-NOR (XNOR) gate 356 that outputs a logic-low when the TFF output is different from the output of a delay circuit 358. The delay circuit delays the output of the TFF by a delay that is set according to the difference between the delay of DFF 352 and the combined delay of TFF 354 and XNOR gate 356. Thus, the output Os will be delayed relative to the clock by a period set according to the delay of DFF 352.

In some embodiments, a delay circuit (not shown), having a delay that is derived from the delay of DLY 358, may be added to the output of DFF 352, to guarantee proper timing at the input of the proceeding circuit (e.g., an SCC).

The configurations of SFF 300 and SFF 350, illustrated in FIGS. 3A, 3B and described hereinabove, are cited by way of example. Other configurations may be used in alternative embodiments. For example, in an embodiment, delay circuit 304 may be replaced by an inverter having a suitable delay (and NAND 306 will have two non-inverting inputs). In another embodiment, delay circuit 358 is coupled to an inverting output (Qn) of TFF 354, and XNOR gate 356 is replaced by a XOR gate.

Figure 4:
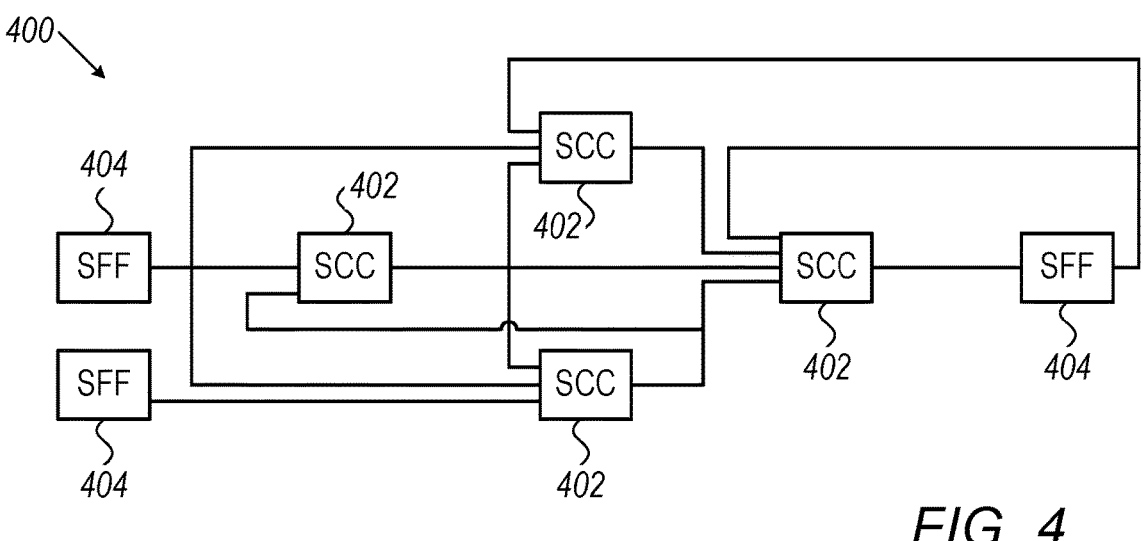
FIG. 4 is a block diagram that schematically illustrates an ARCC, in accordance with another embodiment of the present invention.

FIG. 4 is a block diagram that schematically illustrates an ARCC 400, in accordance with an embodiment of the present invention. ARCC 400 comprises a plurality of SCCs 402 and SFFs 404. Each line in the drawing represents a multi-share signal and its corresponding synchronization signal. Inputs to the cells (I, Is) enter from the left side and outputs (0, Os) exit from the right. When the delay through two or more SCCs is less than a single clock cycle, the SCCs may be coupled directly to each other (that is, the O outputs and the corresponding Os outputs of a first SCC are wired, respectively, to the I and the Is inputs of a second SCC). In embodiments, however, the delay from SFF to SFF through all chained SCCs must not exceed one clock cycle.

When the input of a first SCC is the sampled output of a second SCC, an SFF is inserted between the SCCs. The SFF samples the O output of the second SCC at the rising edge of the clock input to generate the I input of the first SCC, and sends an Is signal, delayed from the rising edge of the clock, to the first SCC Is input.

The configuration of ARCC 400, illustrated in FIG. 4 and described hereinabove is an example that is cited merely for the sake of conceptual clarity. various SCC and SFF interconnect configurations, to fit a variety of computing requirements, may be used in alternative embodiments.

Figure 5:
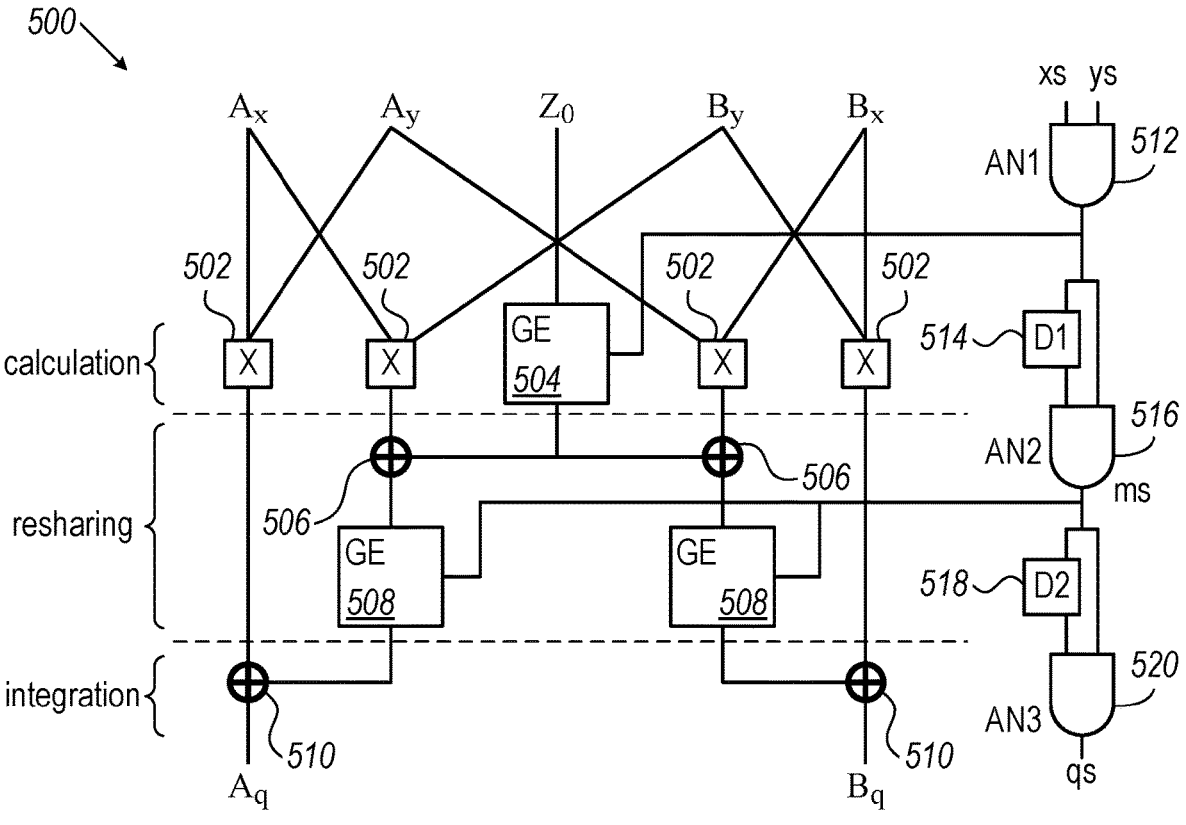
FIG. 5 is a block diagram that schematically illustrates a modified Domain-Oriented Masking (DOM) multiplier SCC, in accordance with an embodiment of the present invention.

FIG. 5 is a block diagram that schematically illustrates a modified Domain-Oriented Masking (DOM) multiplier SCC 500, in accordance with an embodiment of the present invention. The SCC comprises Galois field multipliers 502, which, assuming a 1-bit multiplier, comprise four two-input AND gates 502, a security gate GE 504, XOR gates 506, security gates 508 and XOR gates 510. Security gates 504, 508 may be AND gates, OR gates, latches or any other suitable gates (security gates 504, 508 are, in effect, SGCs, similar in operation to gates 106, FIG. 1).

Multiplier SCC 500 receives inputs x and y by shares Ax and Bx, and Ay and By, respectively, and outputs shares Aq and Bq of the output q. To map the input shares to the output shares, the SCC performs three steps, referred to as calculation, resharing and integration.

In the calculation step, multipliers 502 multiply the terms Ax*Ay, Ax*By, Bx*Ay and Bx*By. The inner-domain multiplications (Ax*Ay and Bx*By) are not critical in terms of security. The cross-domain terms (Ax*By, Bx*Ay), however, present a security hazard and need to be carefully protected.

In the Resharing step, XOR gates 506 add a new random Z share (gated by security gate 504) to the cross-domain terms, making them statistically independent from all other values and, thus, allowing the addition of the terms to any arbitrary domain in a next step. SGCs 508 then gate the outputs of XOR gates 502, blocking any power glitch from propagating through the resharing step.

Lastly, in the Integration step, XOR gates 510 add the reshared cross-domain terms to the domains and generate dual-share Aq and Bq outputs.

SCC 500 further comprises an AND gate 512, which is configured to generate a first synchronization signal that enables security gate 504 only when Z is stable; a delay circuit 514; an AND gate 516, which is configured to generate a second synchronization signal that enables security gates 506 only when the outputs of multipliers 502 are stable; a delay circuit 518; and, an AND gate 520, which is configured to generate a third synchronization signal, indicating q-stable (qs) when data on Aq and Bq is stable. In embodiments, the internal delay of AND gate 512 is set responsively to the delay of the Z input; the delay of delay circuit 514 is set responsively to the combined delay of multipliers 502 and XOR gates 506, and the delay of delay circuit 512 is set according to the delay of XOR gates 508.

The configuration of multiplier SCC 500 illustrated in FIG. 5 and described hereinabove is cited by way of example. Other configurations may be used in alternative embodiments. For example, in an embodiment, enable inputs of the security gates are generated by a timing circuit 108 (FIG. 1). In other embodiments, more than two shares may be used.

FIG. 6 is a flowchart 600 that schematically illustrates a method for protection against power supply side channel attack, in accordance with an embodiment of the present invention. The flowchart can be executed, for example, by SCC 200, including Propagation Delay Circuit 202 (FIG. 2).

The flowchart starts at a Get-Initial-Input-and-Timing Signal operation 602, wherein the SCC gets an initial set of inputs and an initial timing signal. Next, at a First-Stage-Compute operation 604, the SCC securely computes the first stage outputs (for example, executes a multi-share modulo multiplication) and delays the timing signal according to the expected maximum delay of the first-stage compute (as signaled by a synchronization signal).

The SCC then enters a Block-First-Stage-Propagation operation 606 and blocks the propagation of the first stage results until the synchronization signal is asserted; since the timing signal is delayed according to the delay of the first stage compute, this operation guarantees that no power supply glitches will occur.

Next, at a Next-Stage-Compute operation 608, the SCC securely computes the next stage outputs and delays the timing signal according to the expected maximum delay of the next-stage compute. Then, at a Block-Next-Stage-Propagation operation 610, the SCC blocks the propagation of the next stage results until the synchronization signal is asserted (and, hence, the compute stage output is stable), avoiding any power glitches.

The SCC then repeats operations 608 and 610 until the last stage compute is done, and then the flowchart ends.

The configuration of flowchart 600 illustrated in FIG. 6 and described herein above, is cited by way of example. Other flowcharts may be used in alternative embodiments. For example, in some embodiment, sampling stages may be added in the SCC.

The configurations of Attack-Resilient Computing Circuit (ARCC) 100 and 400, Combinatorial Computation Circuit 102, timing circuit 108, SCC 200, SCC 500, SFF 300 and SFF 350 and the method of flowchart 600, illustrated in FIGS. 1 through 6 and described hereinabove, are example configurations and flowcharts that are shown purely for the sake of conceptual clarity. Any other suitable configurations and flowcharts can be used in alternative embodiments. The different sub-units of ARCC 100 may be implemented using suitable hardware, such as in one or more Application-Specific Integrated Circuits (ASICs) or Field-Programmable Gate Arrays (FPGAs).

The terms logic-high and logic-low (as well as the derived rising edge and falling edge terms), referred to hereinabove, should be interpreted as generic designation of opposite logic levels; in embodiments, the voltage level representing a logic-high may be lower than the voltage level representing a logic-low; in some embodiments, logic-high and logic-low may be represented by the polarity of currents, or by low versus high current levels.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Attack Resilient Computation Circuit (ARCC) for performing a secure computation in an integrated circuit (IC), the ARCC comprising:

a first combinatorial logic circuit, configured to perform a first part of the secure computation by processing one or more signals so as to produce one or more outputs, the first combinatorial logic circuit having multiple signal propagation paths;

a second combinatorial logic circuit, configured to receive and process the outputs of the first combinatorial logic circuit, so as to perform a second part of the secure computation;

a security gating circuit, which is inserted between the first combinatorial logic circuit and the second combinatorial logic circuit, and is configured to controllably block the outputs of the first combinatorial logic circuit from reaching the second combinatorial logic circuit until propagation of the signals has completed on all the multiple signal propagation paths in the first combinatorial logic circuit; and security circuitry, configured to mitigate a side-channel attack on the secure computation, by:

generating a synchronization signal indicating that the propagation of the signals has completed on all the multiple signal propagation paths in the first combinatorial logic circuit; and controlling the security gating circuit using the synchronization signal to block the second combinatorial logic circuit from receiving and processing the outputs of the first combinatorial logic circuit.

2. The ARCC according to claim 1, wherein a time interval, during which the second combinatorial logic circuit is blocked from receiving the outputs of the first combinatorial logic circuit, is shorter than one clock cycle of the signals.

3. The ARCC according to claim 1, wherein the security circuitry comprises a security gating timing circuit (SGTC) configured to output the synchronization signal at a time at which propagation of the signals in the first combinatorial logic circuit has completed; and wherein the security gating circuit is configured to gate the outputs of the first combinatorial logic circuit responsively to the synchronization signal.

4. The ARCC according to claim 3, wherein the security gating circuit comprises a logic gate.

5. The ARCC according to claim 3, wherein the security gating circuit comprises a tri-state buffer.

6. The ARCC according to claim 3, wherein the security gating circuit comprises a latch.

7. The ARCC according to claim 3, wherein the SGTC is configured to set the time of outputting the synchronization signal based on the maximal propagation delay of the first combinatorial logic circuit.

8. The ARCC according to claim 1, further comprising a Secure Flip-Flop (SFF) that is coupled between the first combinatorial logic circuit and the second combinatorial logic circuit, the SFF configured to (i) sample an output of the first combinatorial logic circuit responsively to an Output Synchronization (Os) signal, and (ii) send an Input Synchronization (Is) signal to the second combinatorial logic circuit.

9. A method for protecting an integrated circuit (IC), the method comprising:

performing a first part of a secure computation by processing one or more signals in a first combinatorial logic circuit having multiple signal propagation paths, so as to produce one or more outputs;

receiving and processing the outputs of the first combinatorial logic circuit in a second combinatorial logic circuit, so as to perform a second part of the secure computation; and using security circuitry, mitigating a side-channel attack on the secure computation, by:

generating a synchronization signal indicating that propagation of the signals has completed on all the multiple signal propagation paths in the first combinatorial logic circuit; and controlling a security gating circuit, which is inserted between the first combinatorial logic circuit and the second combinatorial logic circuit, to block the outputs of the first combinatorial logic circuit from reaching the second combinatorial logic circuit, using the synchronization signal, until the propagation of the signals has completed on all the multiple signal propagation paths in the first combinatorial logic circuit.

10. The method according to claim 9, wherein a time interval, during which the second combinatorial logic circuit is blocked from receiving the outputs of the first combinatorial logic circuit, is shorter than one clock cycle of the signals.

11. The method according to claim 9, wherein controlling the security gating circuit comprises:

outputting the synchronization signal at a time at which propagation of the signals in the first combinatorial logic circuit has completed; and gating the outputs of the first combinatorial logic circuit by the security gating circuit responsively to the synchronization signal.

12. The method according to claim 11, wherein the security gating circuit comprises a logic gate.

13. The method according to claim 11, wherein the security gating circuit comprises a tri-state buffer.

14. The method according to claim 11, wherein the security gating circuit comprises a latch.

15. The method according to claim 11, wherein outputting the synchronization signal comprises setting the time of outputting the synchronization signal based on the maximal propagation delay of the first combinatorial logic circuit.

16. The method according to claim 9, further comprising, by a Secure Flip-Flop (SFF) coupled between the first combinatorial logic circuit and the second combinatorial logic circuit, (i) sampling an output of the first combinatorial logic circuit responsively to an Output Synchronization (Os) signal, and (ii) sending an Input Synchronization (Is) signal to the second combinatorial logic circuit.

* * * * *